United States Patent
Biswas et al.

(10) Patent No.: US 11,442,928 B2
(45) Date of Patent: Sep. 13, 2022

(54) MULTI-TENANT PROVIDER NETWORK DATABASE CONNECTION MANAGEMENT AND GOVERNANCE

(71) Applicant: Amazon Technologies, Inc., Seattle, WA (US)

(72) Inventors: Chayan Biswas, Fremont, CA (US); Anoop Gupta, Seattle, WA (US); Sirish Chandrasekaran, Berkeley, CA (US); Lawrence Webley, Seattle, WA (US); Anton Okmyanskiy, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 16/673,689

(22) Filed: Nov. 4, 2019

(65) Prior Publication Data
US 2021/0133183 A1 May 6, 2021

(51) Int. Cl.
*H04L 67/101* (2022.01)
*G06F 16/23* (2019.01)

(52) U.S. Cl.
CPC ........ *G06F 16/2379* (2019.01); *H04L 67/101* (2013.01)

(58) Field of Classification Search
CPC .......................... G06F 16/2379; H04L 67/101
See application file for complete search history.

(56) References Cited

U.S. PATENT DOCUMENTS

2018/0039678 A1* 2/2018 de Lavarene ........... H04L 67/42

FOREIGN PATENT DOCUMENTS

| CN | 103970807 A | 8/2014 |
|---|---|---|
| WO | 2008/149337 A2 | 12/2008 |
| WO | 2017/176533 A1 | 10/2017 |

OTHER PUBLICATIONS

International Search Report and Written Opinion, PCT App. No. PCT/US2020/057624, dated Feb. 12, 2021, 12 pages.

* cited by examiner

*Primary Examiner* — Ryan J Jakovac
(74) *Attorney, Agent, or Firm* — Nicholson De Vos Webster & Elliott, LLP

(57) ABSTRACT

Techniques for database connection management and governance in a multi-tenant provider network are described. One or more database proxy instances connect to client applications and can obtain database connections for these client applications. The database connections may be pinned to particular client applications and/or multiplexed and thus shared by multiple client connections.

25 Claims, 16 Drawing Sheets

```
605

CREATE-DB-PROXY
    --DB-PROXY-NAME '...'
    --ENGINE-FAMILY <DB_ENGINE1 | DB_ENGINE2>
    --AUTH [{ }, { }]
    --SUBNET-IDS {}
    --REQUIRE-TLS <TRUE | FALSE>
    --TAGS {}
```

```
610

REGISTER-DB-PROXY-TARGETS
    --TARGET-GROUP-NAME '...'
    --DB-CLUSTER-IDENTIFIER '...'
    --DB-INSTANCE-IDENTIFIER '...'
```

*FIG. 6*

PROXY CONFIGURATION

PROXY IDENTIFIER

| DATABASE-1_PROXY-1 |

☑ REQUIRE TRANSPORT LAYER SECURITY

CONNECTION POOL MAXIMUM CONNECTIONS

| 90% ▼ |

CREDENTIAL MANAGER SECRET(S)

| *CHOOSE ONE OR MORE "SECRETS"* ▼ |

IAM ROLE FOR ACCESSING SECRET(S)

| *CHOOSE IAM ROLE* ▼ |

IAM AUTHENTICATION TO CONNECT TO PROXY

| *REQUIRED* ▼ |

CANCEL     NEXT

*FIG. 7*

CREATE PROXY

PROXY CONFIGURATION

PROXY IDENTIFIER

| DATABASE-1_PROXY-1 |

ENGINE FAMILY

| MYSQL ▼ |

☑ REQUIRE TRANSPORT LAYER SECURITY ( CANCEL )   ( NEXT )

*FIG. 8*

CREATE PROXY

TARGET GROUP CONFIGURATION

ADD DATABASES

| DATABASE-1_PROXY-1 ▼ | ADD |

| DATABASE 'B'  X | DATABASE 'D'  X |
| MYSQL | MYSQL |

IDLE CLIENT TIMEOUT

| 30 ▼ | MINUTES | 00 ▼ | SECONDS |

▼ ADDITIONAL TARGET GROUP CONFIGURATION

SESSION PINNING FILTERS

| EXCLUDE VAR SETS ▼ |

CONNECTION BORROW TIMEOUT

| 2 ▼ | MINUTES | 00 ▼ | SECONDS |

CANCEL    NEXT

*FIG. 9*

CREATE PROXY

AUTHENTICATION

CREDENTIALS MANAGER RESOURCE NAME

[ CHOOSE SECRET RN ▼ ]

IAM ROLE

[ CHOOSE IAM ROLE ▼ ]

AUTHENTICATION METHOD

[ DATABASE AUTH. (USERNAME/PASSWORD) ▼ ]

VIRTUAL NETWORK FOR DB CLUSTER

[ DEFAULT VIRTUAL NETWORK (VPC-F39B7C9A) ▼ ]

SUBNETS

[ CHOOSE A SUBNET ▼ ]

[ DEFAULT  X ] [ SUB-1A  X ]

[ CANCEL ]  [ NEXT ]

*FIG. 10*

CREATE PROXY

CAPACITY SETTINGS

☑ AUTO-MANAGE PROXY CAPACITY

| | | |
|---|---|---|
| MINIMUM PROXY CAPACITY UNITS | 2 | (2 PROC, 2GB RAM) ▼ |
| MAXIMUM PROXY CAPACITY UNITS | 256 | (10 PROC, 128GB RAM) ▼ |

[ CANCEL ]   [ CREATE PROXY ]

*FIG. 11*

```
private static final String JDBC_URL = "jdbc:mysql://" + DATABASE_INSTANCE_HOSTNAME
+ ":" + DATABASE_INSTANCE_PORT;
```

```
private static final String JDBC_URL = "jdbc:mysql://" + DBPROXY_DNS_NAME + ":" +
DBPROXY_PORT;
```

MULTI-TENANT PROVIDER NETWORK DATABASE CONNECTION MANAGEMENT AND GOVERNANCE

BACKGROUND

Developing modern software applications that use databases to not only scale readily but also effectively is extremely complicated. Such an effort requires a careful matching of application demands with the available database capacity to maintain predictable performance at a reasonable cost and complexity. For example, a trading platform application may swiftly scale up in reaction to market events and create a surge of database connections. Similarly, an e-commerce application may keep database connections open and idling to provide faster response to buyers when they engage.

As a result, many developers over-provision database capacity to be able to handle peak (or even over-peak) expected utilization, which is extremely wasteful of resources as many database resources will thus typically remain idle, increases complexity and management overhead, and increases overall cost. Moreover, developers may also need to distribute their database(s) over multiple instances to gain additional capacity, increasing complexity. Even then, applications and databases can still get overwhelmed when unforeseen peaks are encountered.

BRIEF DESCRIPTION OF DRAWINGS

Various embodiments in accordance with the present disclosure will be described with reference to the drawings, in which:

FIG. 6 is a diagram illustrating exemplary application programming interface calls used in an environment for database connection management and governance in a multi-tenant provider network according to some embodiments.

FIG. 7 is a diagram illustrating an exemplary user interface of a database service for configuring a database proxy for database connection management and governance in a multi-tenant provider network according to some embodiments.

FIG. 8, FIG. 9, FIG. 10, and FIG. 11 are diagrams illustrating exemplary user interfaces for creating a database proxy for database connection management and governance in a multi-tenant provider network according to some embodiments.

DETAILED DESCRIPTION

The present disclosure relates to methods, apparatus, systems, and non-transitory computer-readable storage media for database connection management and governance in a multi-tenant provider network. According to some embodiments, a database service provides a fully managed connection governance and management system that can intelligently reuse established database connections to serve queries or transactions from multiple application connections. As a result, fewer database connections can support a larger number of application connections. The database service may thus allow users to maintain predictable database performance by regulating the number of database connections that are opened and shedding unserviceable applications connections. The connection governance and management system can automatically perform management functions on behalf of its users, such as through automated provisioning, updating, scaling, and/or fault tolerance functionalities. Moreover, embodiments can scale capacity automatically in response to application load and can distribute workload across multiple fault-tolerance zones to minimize disruption from hardware or system failures.

Accordingly, applications—including those built on modern "serverless" technologies—can efficiently use relational databases with scalability with predictable performance. By regulating application connections to the database and reutilizing database connections to serve multiple application requests, embodiments provide resiliency for applications that can transparently tolerate transient failures without needing complex failure handling code. In some embodiments, database traffic destined to a database can be quickly and automatically routed to a standby database instance while preserving application connections. Further, in some embodiments, users can build secure applications that utilize databases through centralized credential management and through optional enforcement of database authentication through IAM roles. Beneficially, embodiments disclosed herein remove the burden commonly placed on application developers to deploy, manage, or scale database connection related computing infrastructure.

Figure 1:
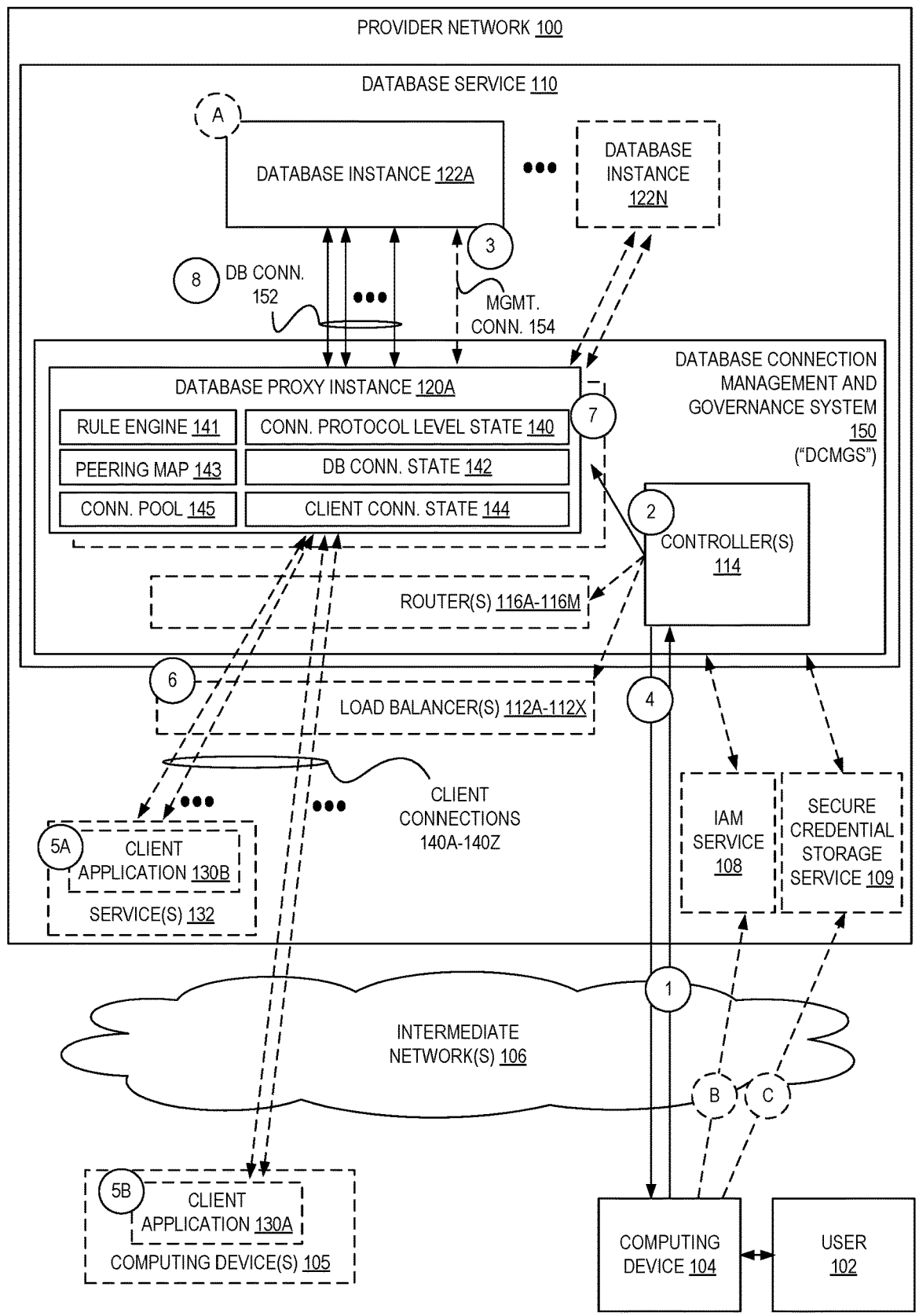
FIG. 1 is a diagram illustrating an environment for database connection management and governance in a multi-tenant provider network according to some embodiments.

FIG. 1 is a diagram illustrating an environment for database connection management and governance in a multi-tenant provider network according to some embodiments. FIG. 1 illustrates a database connection management and governance system 150 (or "DCMGS") of a database service 110 that performs database connection management and governance via use of one or more database proxy instances 120A-120N. The DCMGS 150 and database service 110 may be implemented as software, hardware, or a combination of both. In some embodiments, the implementation of these components may be part of a provider network 100.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

Thus, a cloud provider network (or just "cloud") typically refers to a large pool of accessible virtualized computing resources (such as compute, storage, and networking resources, applications, and services). A cloud can provide users with convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network 106 (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Generally, many types of modern computing applications rely on databases, and in particular, relational databases. Computing applications, such as websites or mobile application backends, may be implemented within a provider network 100 using one or more compute-type services 132 such as a hardware virtualization service or serverless code execution service, or in another location by one or more computing devices 105 (e.g., by applications executing in a data center, by applications executed by "client" devices such as personal computers, smart devices, mobile devices, etc.). At some point, these computing applications may use database functionality provided by one or more database instances 122A-122N of a database service 110 by sending messages carrying database statements (e.g., Structured Query Language (SQL) statements) to the database instance(s) 122A-122N, which can perform operations in response and optionally send back database results (e.g., status indicators, data stored by a database, data generated based on data stored by the database responsive to a query, etc.). In this manner, the computing applications act as a "client" application 130A-130B by requesting the database instance(s) 122A-122N to perform some operation(s) and thus act as a "server."

In some embodiments, a database instance 122A-122N is an isolated database environment running in the provider network 100, and typically contains one or multiple user-created databases that can be accessed using the same client tools and applications that are used to access standalone database instances. Each database instance 122A-122N may have a database instance identifier, which can be a user-supplied name that uniquely identifies (e.g., within the entire provider network 100, or within a portion or region of the provider network 100) the database instance 122A-122N during interactions between the user and the database service 110 interfaces. Each database instance 122A-122N may support a database engine. For example, the database service 110 may support a number of database engines, including but not limited to MySQL, MariaDB, PostgreSQL, Oracle, Microsoft SQL Server, Amazon Aurora, etc. In some embodiments, the database service 110 may support one or more NoSQL databases, one or more object database management systems, one or more object-relational database systems, one or more data warehouse systems (e.g., Amazon Redshift), a "serverless" interactive query service, or the like. Interactions with the database instance(s) 122A-122N may be performed via use of database statements (e.g., queries, commands, or the like) that may adhere to a defined query language (as defined by a query language definition), such as one or more of the many dialects, extensions, and implementations of SQL, like Transact-SQL (T-SQL), Procedural Language/SQL (PL/SQL), PL/pgSQL (Procedural Language/PostgreSQL), SQL-86, SQL-92, SQL: 2016, etc. The database instance(s) 122A-122N may thus implement a variety of types of databases in a variety of types of configurations. For example, a first database instance 122A and a second database instance 122B may be a master-failover pair, completely different databases, etc.

In some embodiments, users 102 may interact with the DCMGS 150 to configure database proxy service that automatically manages and governs database connections on behalf of the user and the user's applications 130A-130B.

As indicated above, many types of modern applications 130A-130B reliant on databases may need to overprovision and manage database resources for a variety of reasons. The DCMGS 150 can eliminate such overprovisioning and active management typically required.

For example, many applications have unpredictable workloads. Applications that support highly variable workloads may attempt to open a burst of new database connections to support surges. The DCMGS's 150 connection governance functionalities can allow users to gracefully scale applications dealing with unpredictable workloads by efficiently using database connections. The DCMGS 150 can reutilize established database connections to serve queries or transactions from multiple application requests. Thus, users can support more application connections over fewer database connections, providing the efficient use of database resources. The DCMGS 150 can allow users to maintain predictable database performance by regulating the number of database connections that are opened. In some embodiments, the DCMGS 150 can shed unserviceable application requests to preserve the overall performance and availability of the application.

As another example, some applications frequently open database connections. Applications built on technologies such as serverless, PHP, or Ruby on Rails may frequently open new database connections on application requests. The DCMGS 150 can allow customers to maintain a pool of database connections to avoid the inefficiencies of establishing new connections with each new request.

Moreover, many applications keep database connections open but idle (or unused). Applications in industries such as SaaS or eCommerce often keep database connections idling to minimize the response time when a customer reengages. Instead of overprovisioning databases to support mostly idling connections, users can configure the DCMGS 150 to maintain these idle connections while only establishing database connections as required to optimally serve active requests.

As yet another example, many applications require high availability through transient failures. In some embodiments, the DCMGS 150 can allow users to build resilient applications that can transparently tolerate transient failures without complex failure handling code. The DCMGS 150, in some embodiments, automatically routes traffic to a standby database instance very quickly while preserving many or all application connections.

Further, the DCMGS 150 in some embodiments provides improved security and centralized credential management. The DCMGS 150 aids users in building secure applications by giving them a choice to enforce Identity and Access Management (IAM) based authentication (e.g., via an IAM service 108) for accessing databases, and can also enable users to centralize database credentials management through a secure credential storage service 109.

For example, a user 102 may utilize an application (e.g., a web-based console) or other functionality to launch one or more database instances 122A-122N (as reflected by circle (A)) within a database service 110, which may be relational databases, NoSQL instances, or other type of database. For example, the user 102 may utilize a web-based console application to select a "launch DB instance" user interface input element and provide a number of configuration parameters, such as an identifier of a requested DB engine type and version, license model, instance type, storage type and amount, master user credentials, etc. Alternatively, the computing device of the user may issue an API call to the database service 110 with similar information, or the user may launch and/or configure database instances using other techniques known to those of skill in the art.

Optionally, as shown by circle (B), the user 102 may cause the computing device 104 to configure an IAM service 108 with role information allowing the DCMGS 150 to create resources on behalf of the user's account (e.g., one or more load balancers 112A-112X, one or more routers 116A-116M, one or more database proxy instance(s) 120A-120N, etc.), and/or to configure the IAM service 108 with execution role information associated with a client application 130A-130B.

As shown by circle (C), the user 102 may also optionally store a "secret" value (e.g., a username and/or password for accessing the database instance(s)) with a secure credential storage service 109 (e.g., AWS Secrets Manager) that can securely (e.g., via encryption, access controls, etc.) store and control access to these secret values.

The user 102 may then, via use of an application executed by the computing device 104, configure the DCMGS 150 to provide connection management and governance for the database instance(s) 122. As one example, the user 102 may utilize one or more user interfaces, such as one or more of those depicted in FIG. 7, FIG. 8, FIG. 9, FIG. 10, and/or FIG. 11, to provide configuration information via one or more messages (as shown at circle (1)) to a controller 114 (of potentially many controllers 114 that may be run in a distributed manner) of the DCMGS 150. The configuration information may include, among many types of data, one or more of identifiers of the database instance(s) 122A-122N, a name for the proxy, an identifier of the type(s) of database engines implemented by the database instance(s) 122A-122N, whether backend database connections should be encrypted (e.g., using TLS), a set of tags, etc. Further examples of potential types of configuration information will be provided with regard to the later description of FIGS. 7-11.

Upon receipt of these one or more requests, the controller 114 may initiate a workflow to configure database connection management and governance accordingly. For example, in some embodiments the controller 114 creates resources in a provider network account that is associated with the user's account, such as an endpoint (e.g., an entity associated with a network address that can receive network traffic destined to that address) that will later be used by the client application(s) 130 to send database statements toward the database instance(s) 122. The workflow may also include provisioning one or more database proxy instances 120A-120N, which may include launching compute instances (e.g., virtual machines) with database proxy software configured as described herein, and/or configuring the database proxy instance(s) 120A-120N for the user (e.g., configuring a rule engine 141 with system and/or user-provided rules to control how each database proxy instance is to operate). In some embodiments, the controller 114 may launch at least two database proxy instances 120A-120N (e.g., in an active-active configuration), which may be specifically placed in different availability zones (e.g., isolated failure domains) of the provider network 100. Before and/or after the launch of each database instance(s) 122A-122N, the controller 114 may directly (or indirectly, such as via configuration initialization files or flags) configure the database instance(s) 122A-122N and/or the database proxy instance(s) 120A-120N according to configuration information provided by the user (e.g., at circle (1)).

Upon being launched and configured, in some embodiments each database proxy instance 120A-120N opens a management connection 154 at circle (3) to each database instance 122 (as identified by the user 102 during the initial configuration), optionally using authentication/authorization information (e.g., credentials) provided by the user 102 as configuration information, provided by the IAM service 108, provided by the secure credential storage service 109, etc. The management connection 154 allows the database proxy instance(s) 120A-120N to ensure that the database instance(s) 122A-122N are running and responsive, that the database instance(s) 122A-122N can be successfully accessed via provided credentials, etc. The management connection 154 may also allow the database proxy instance(s) 120A-120N to detect a failure of a database instance 122A and cause additional database statements received during this downtime to be instead passed to another database instance (e.g., a failover database instance), and/or may restore the use of the initial database instance if it comes back up. Thus, for client connections that were not actively using a backend database connection to a failed database instance, these clients may not be impacted by or even notice the failure whatsoever.

The controller 114, as part of the workflow, may also configure a load balancer 112, one or more routers 116A-116M, and the endpoint, so that the endpoint provides database statements (e.g., requests originated by clients that are destined to a database instance) to a database proxy instance (e.g., 120A), which may occur through the load balancer 112 to a router 116, which may identify a database proxy instance 120A, such as via an endpoint identifier of that where the database statement was received. The controller 114 may also configure a rule engine 141 of each database proxy instance 120 with rules to control how the database proxy instance 120A is to operate. The rules may be configured by the operator of the provider network 100 and/or by the user 102. For example, a user 102 may provide configuration data indicating if the user 102 wishes to pin certain client connections to certain database connections, and optionally an indication of how to determine which connections are to be so pinned (e.g., defining conditions of a client connections—such as the presence of a database statement that creates a prepared statement—that, when observed, are to cause the client connection to be pinned to a database connection). As another example, the user 102 may provide configuration data indicating if, when, and/or how to treat connections as being terminated (e.g., due to an amount of inactivity), whether connection multiplexing is to be enabled, whether pinning is to be enabled, what number of possible database connections may be utilized, whether (and/or how) to rewrite certain database statements, etc. During operation, each database proxy instance 120A may thus use this rule engine 141 and the associated rules to determine what operations to perform.

In some embodiments, the router(s) 116 and database proxy instance(s) 120A-120N may implement a heartbeat mechanism in which the database proxy instance(s) 120A-120N send a heartbeat message on a periodic or scheduled basis to one or more of the routers 116A-116M that indicates the continued availability of the database proxy instance(s) 120A-120N. In some embodiments, the heartbeat message includes a load value indicating a "load" currently (or recently) being placed on that proxy instance. For example, the load value may be a number of client connections 140A-140Z that the database proxy instance 120A is handling (or has the ability to handle), and/or an amount of processor utilization, memory utilization, network utilization, etc.

In some embodiments, the router 116A may select one of the database proxy instance(s) 120A-120N to be a recipient of a client connection based on this load value associated with each of the one or more database proxy instance(s) 120A-120N that are associated with the endpoint in which the database statement was received. For example, the router 116A may select a least loaded one of those matching database proxy instance(s) 120A-120N, e.g., having a smallest load value, though other routing mechanisms may be implemented. Such a mechanism can beneficially provide value when there are multiple routers 116 utilized, as a purely "local" decision made on the part of the router may be non-optimal due to the actions of other routers. For example, although one router may only send a small number of connections to a particular database proxy instance (and thus it may appear, locally, as being not busy), it may be the case that other routers have sent a huge number of connections to the proxy instance. As a result, the router can avoid making a poor decision based only on its local view, and instead can gain global visibility into the true load of the proxy due to the reported load value via the heartbeat messages.

The controller 114 may then, at circle (4), send an identifier of the endpoint (e.g., one or more of an IP address, hostname, port value, etc.) to the computing device 104 of the user 102, which the user 102 can use to configure the client application(s) 130A-130B at circle (5A) and/or circle (5B). For example, the user 102 may update a database connection string used by the client application 130 to connect to the database instance(s) via that endpoint identifier.

Thereafter, upon a client application 130 needing to access a database instance 122, the client application 130 may open a client connection 140A with a database proxy instance 120A at circle (6). This connection may be implemented by, for example, a client application 130B executed within a virtual network within the provider network 100 sending a request to an endpoint within the virtual network, which is thus routed to a load balancer 112, router 116, and/or database proxy instance 120A that may be outside the virtual network—in this manner, the database proxy 120A can be optionally "surfaced" within multiple different virtual networks within the provider network 100.

The database proxy instance 120A may use a role of, or an authentication token provided by, the calling application for authorization and/or authentication, e.g., by utilizing an IAM service 108 to determine whether the role is allowed access to the database instance (and thus the client application need not have direct access to database authentication credentials), to determine whether the authentication token is valid and is associated with privileges to access the database instance, etc. Additionally, or alternatively, the database proxy instance 120A may use a token provided by the client application (e.g., as part of opening the connection or with a database statement request) to retrieve a credential (e.g., a username and/or password) for accessing the database instance, or retrieve this token from the IAM service 108 and use it with the secure credential storage service 109 to obtain the credential, which may be passed on to the database instance 122A to authenticate the client. Additionally, or alternatively, the database proxy instance 120A may use a token comprising a username/password provided by the client application (e.g., as part of opening the connection or with a database statement request) to directly authenticate the client with the database instance.

The database proxy instance 120A may obtain a database connection 152 (between the proxy and the database instance) at circle (7) by opening a new database connection 152, identifying and thus selecting a database connection from a connection pool 145 of available open connections that matches the characteristics of the client connection, or update an existing connection from the pool 145 of open available connections to match an expected connection state for the client connection (e.g., by sending database statements/commands to the database instance to change a session state as described herein). In some embodiments, the database connection 152 may or may not be "pinned" to the client connection (i.e., dedicating it for that client's use) based on configured rules and/or thresholds, and further may be switched between being un-pinned (i.e., multiplexed) to pinned or between being pinned to un-pinned with similar rules and/or thresholds. When a particular client connection and database connection have been peered—either temporarily or when pinned—the database proxy instance 120A may update a peering map 143 data structure so that it can determine which connections are in use, which connections are peered, etc. In some embodiments, when a database connection that is in the pool 145 is selected and used, the database proxy instance 120A may thus remove that connection from the pool 145 (e.g., by removing an identifier of the connection, or updating a status flag associated with the connection, from the pool 145 structure) and/or update the peering map 143 to reflect the association of the connections.

In some embodiments, the database proxy instance 120A may track the database statement traffic to identify commands or actions made within the traffic that cause the session state of the connection be modified. The database proxy instance 120A may thus maintain a mapping, for each client connection (in a client connection state 144 store) and database connection (in a database connection state 142 store), of the current "state" of the connection.

It is known that for a database connection, a client application and/or the database instance itself may set or modify settings of the connection. For the life of this connection—or until these settings are further modified—both the database instance and the client implicitly assume this state to have been agreed upon. However, due to possible multiplexing of these database connections 152, a particular database connection 152 may be used by different clients having different expectations as to the state of the connection. Thus, the database proxy instance 120A may track the database statement traffic to identify the state of the connection, e.g., by watching for particular known statements that cause state changes. This state may thus be tracked, as indicated above, on a per client connection and database connection basis via state 142/144.

Thereafter, when a database statement is received on a client connection 140A, if the client connection is not "pinned" to a particular database connection, the database proxy instance 120A can identify an available open connection from the pool 145 of connections between the proxy instance and the database instance using the tracked state of the client connection (144) and comparing it to the state of ones of the database connections (142). It may be the case that an exact match is found, and thus that matching database connection 152 can directly be used to process that database statement. However, if no matching database connection is found via this state comparison process, the database proxy instance 120A can modify the state of an available database connection to match the client connection state, e.g., by replaying or issuing one or more database statements (e.g., to set an encoding value or time zone).

Various types of state may be tracked in various embodiments depending on the particular types of database protocols in use. For example, the state may include system variables that have been set on a per-connection basis, including but not limited to a time zone value, a session timeout, a connection mode (e.g., read/write), a particular mode of interpretation the database uses (e.g., ANSI mode, traditional mode), etc. As another example, the state may include connection properties, including but not limited to a character set, a user name, whether the connection uses encryption, etc. As another example, the state may include database properties such as the existence of a temporary table or prepared statement (e.g., a SQL template) that was created during the connection (that may need to be referenced later).

However, in some embodiments, if any (or particular types) of state changes are made, the database proxy instance(s) 120A-120N may alternatively "pin" the client connection with the associated database connection (thus eliminating multiplexing for that database connection until the client connection terminates), which may be conditioned on the proxy instance having sufficient other database connections that would remain available (per a configurable threshold) for multiplexing.

Having obtained a proper database connection 152, at circle (8) the database proxy instance 120A can forward the database statement received from the client application 130 to the database instance 122A, which can process the database statement and return any necessary response, which can be sent back to the client application 130.

In some embodiments, the database proxy instance 120A may also track the connection protocol level state 140 of each connection to determine whether the database instance has completed all processing for a particular database statement (e.g., query). Thus, the database proxy instance 120A may be state-aware in terms of the connection protocol itself and keep track of this state as connection protocol level state 140. Thus, the database proxy instance 120A can determine at which point it can "release" a database connection 152 into the pool as an available connection. For example, in the middle of a transaction (e.g., between when a query seeking data has been passed to the database instance and when all data has been returned) it is improper to release the connection, but when the database proxy instance 120A can verify that the transaction has completed it can release it. The database proxy instance 120A may need to track various subtle protocol scenarios to prevent early release, such as when a client sends a multi-statement query (wherein the database will return multiple sets of results), and thus the database proxy instance 120A may track how many sets of results are to returned and thus may determine when the transaction is complete.

Figure 2:
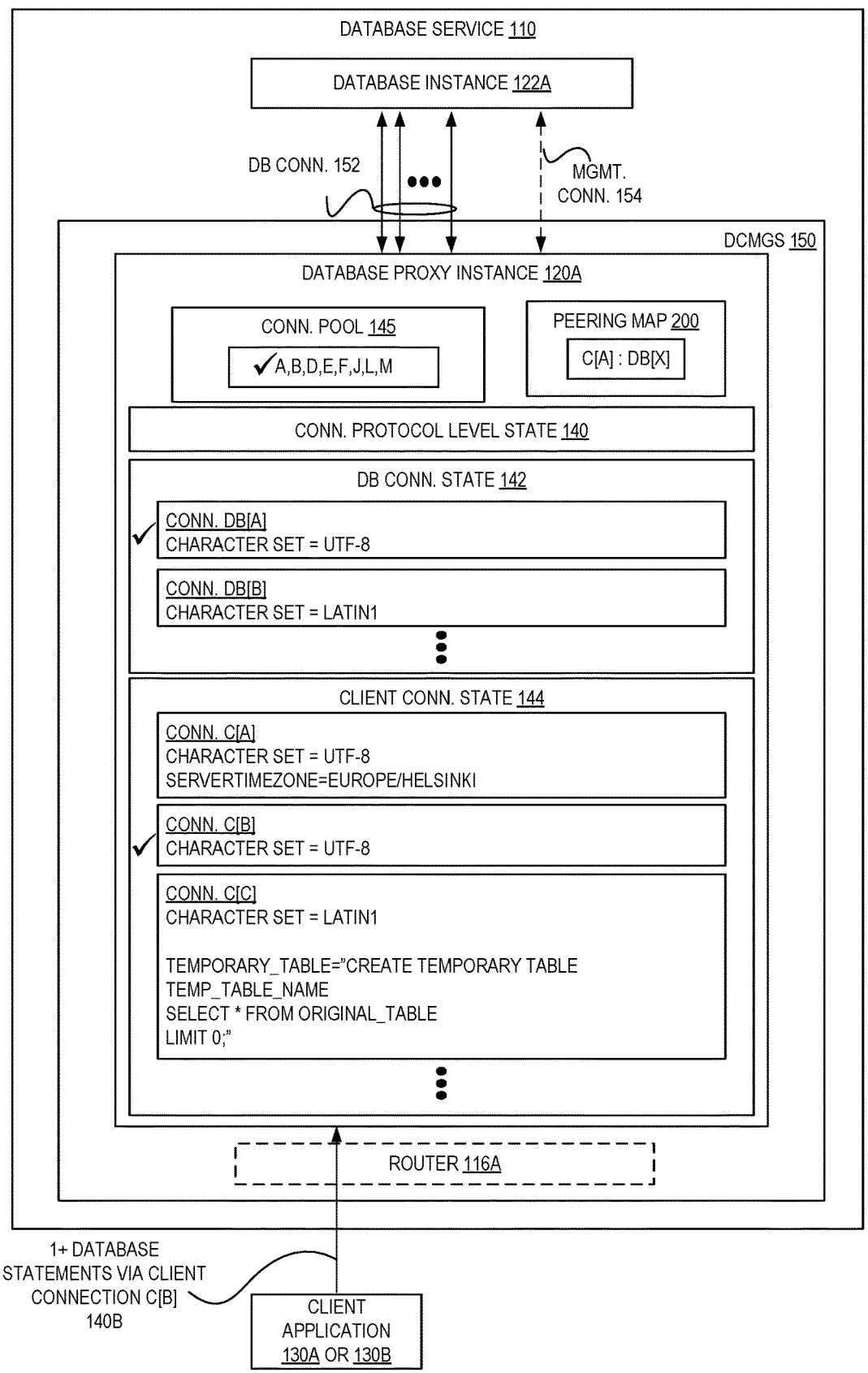
FIG. 2 is a diagram illustrating database session state tracking and connection matching according to some embodiments.

For further detail, FIG. 2 is a diagram illustrating database session state tracking and connection matching according to some embodiments. In this example, a database proxy instance 120A of the DCMGS 150 receives one or more database statements (or, commands) over an existing client connection C[B] 140B. Thus, the database proxy instance 120A is to obtain a database connection 154 for forming an end-to-end client-to-database connection, which it can use to pass the one or more database statements and receive a response from the database instance. As indicated previously, the database proxy instance 120A may track connection-related information, such as client connection state 144, database connection state 142, connection protocol level state 140, connection pool 145 availability information (e.g., where each entry indicates which database connections 152 are still in use or are available for use), and/or a connection peering map 200 storing peering entries indicating which of the client connections are using which of the database connections (either at a point in time, or as a "pinned" peering).

To obtain a database connection 152, the database proxy instance 120A may be configured flexibly according to the needs of the implementor to perform one or operations. For example, in some cases the database proxy instance 120A may check to see if the client connection has been "pinned" to a backend database connection, and thus, the backend database connection has been reserved for exclusive use for the client connection. Such mapping information may be tracked, for example, as part of a peering map 200 that associates client connections with corresponding database connections. If a matching database connection is found for the client connection, it may be used; otherwise, the database proxy instance 120A may proceed with other operations.

For example, in some embodiments the database proxy instance 120A may create a new database connection, which may or may not be pinned for the client connection. This may occur, for example, up to some connection limit imposed by the database instance or by the configuring user.

In some embodiments the database proxy instance 120A may attempt to find a "matching" database connection having a same state as that of the client connection. For example, the database proxy instance 120A may attempt to find similar state between entries of the database connection state 142 with the entry of the client connection state 144 corresponding to the client connection that the database statements arrived over. As illustrated, the client connection C[B] state 144 indicates that the connection/session expects the character set to be "UTF-8", and a matching database connection DB[A] state 142 is found that also has the character set as "UTF-8" (and also is marked as being "available" in the connection pool 145 availability state)—thus, this connection is appropriate for use as it does not at all conflict with any assumptions/expectations of the client connection.

Additionally, or alternatively, the database proxy instance 120A may update an existing database connection state to match the state expected by the client connection. For example, the client connection C[C] state 144 is shown as including a character set of LATIN1 and a temporary table that has been defined. The database proxy instance 120A may update an existing database connection to a state that matches this—for example, by "replaying" the temporary table creation database statement with the database connection C[B], or by both replaying the temporary table creation database statement and also changing the character set (from UTF-8 to LATIN1) with connection C [A].

Figure 3:
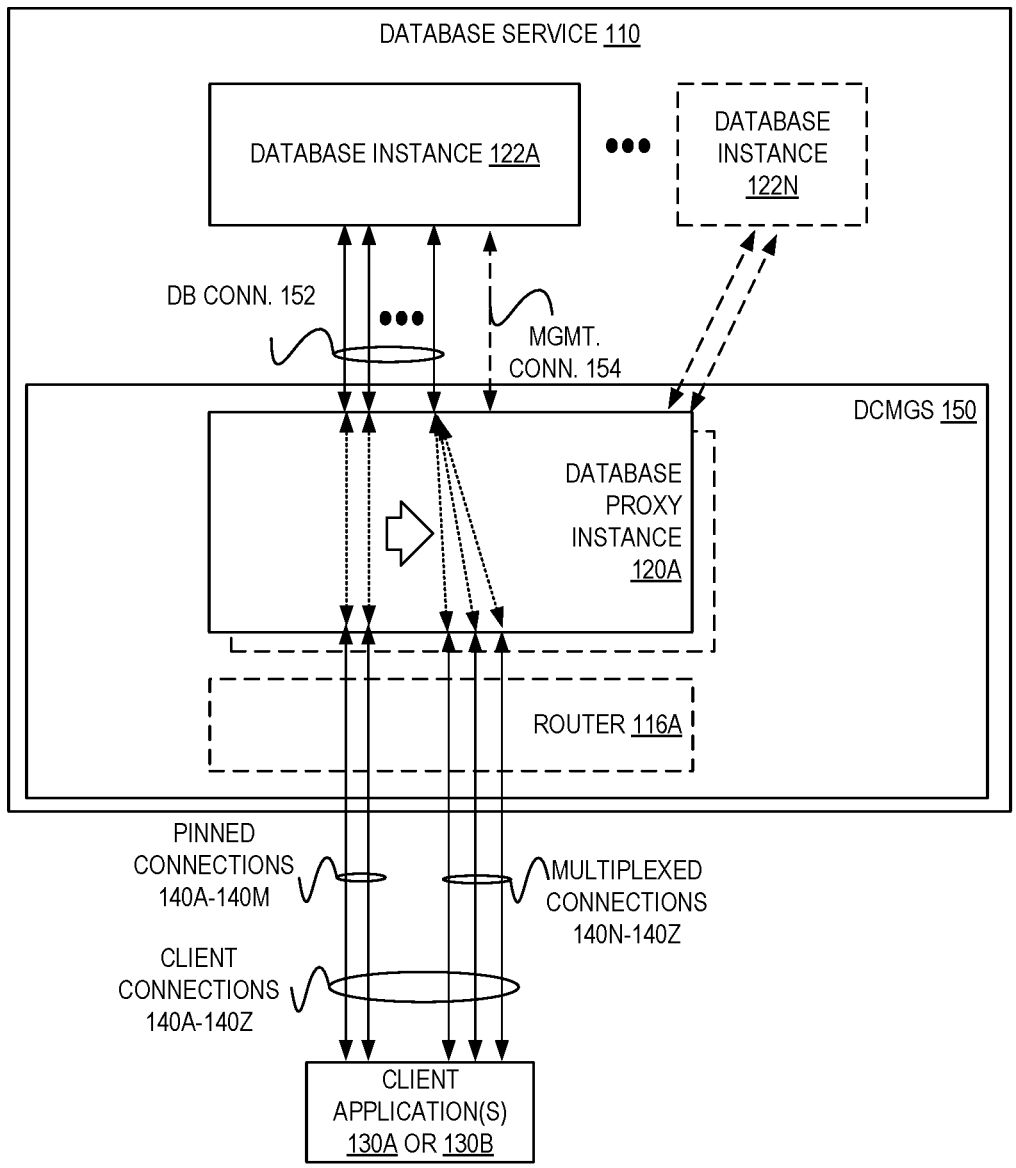
FIG. 3 is a diagram illustrating dynamic database connection multiplexing according to some embodiments.

FIG. 3 is a diagram illustrating dynamic database connection multiplexing according to some embodiments. In some embodiments, the DCMGS 150 may implement a dynamic connection multiplexing technique in which client connections may be pinned to backend database connections up to a point or threshold (e.g., some threshold number of maximum connections are being utilized), and after that point the DCMGS 150 may begin database connection multiplexing with future and/or existing client connections. The DCMGS 150 may also move back to using pinned connections as the threshold (or a second threshold) is crossed again in the other direction. For example, the DCMGS 150 may use only pinned connections until 75% of the allowed database connections 152 are used, and then past that threshold the DCMGS 150 may begin multiplexing additional database connections for subsequent client connections and/or existing (previously pinned) client connections. Moreover, the DCMGS 150 may return to exclusive use of pinned connections, e.g., when some threshold (e.g., less than 50%) of the connections are in active use at a point in time or over a window of time. Such use of multiple thresholds may prevent "thrashing" between these states that may possibly occur when a single threshold is used.

Accordingly, through use of dynamic multiplexing embodiments can enable increased processing speed via the use of pinned connections 140A-140M (that do not require the sort of backend database connection obtaining operations) while flexibly allowing for additional multiplexed connections 140N-140Z that collectively (with the pinned connections 140A-140M) allow for more client connections to the database instance 122A than the database instance 122A can directly provide (via database connections 152).

Figure 4:
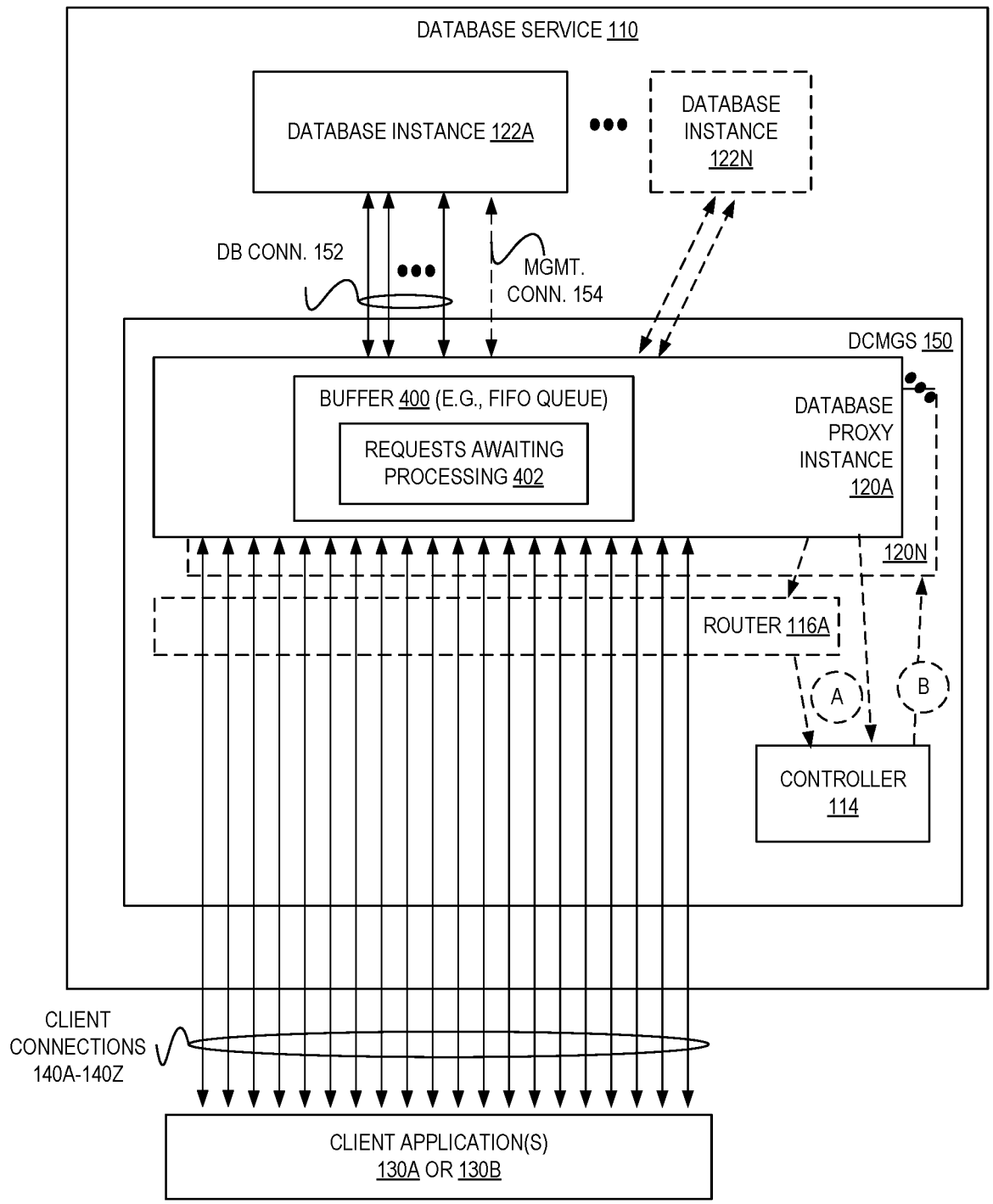
FIG. 4 is a diagram illustrating database connection buffering in a database proxy instance according to some embodiments.

FIG. 4 is a diagram illustrating database connection buffering in a database proxy instance according to some embodiments. In some embodiments, a database instance 122A may prevent database failures through connection governance in which, for example, a database instance 122A may buffer 400 requests (e.g., database statements such as queries, which may be implemented using a first-in first-out (FIFO) queue or similar) arriving over client connections 140A-140Z when there are more requests 402 awaiting processing than database connections 152 available for use by the database instance 122A. Thus, by tracking the database protocol state of actively-used database connections 152, upon detecting the conclusion of a session that database connection can be re-used for one of the buffered requests 402, allowing these buffered requests 402 to still be served (albeit with some introduced delay) instead of previous systems where a failure would have been encountered (e.g., a client could not connect to a database instance) that the client application would have needed special connection management logic to gracefully handle without impacting its users.

Optionally, in some embodiments this scenario may cause for a horizontal scaling of the set of database instance(s) 122A-122N, e.g., by the database instance 122A providing its load value (via a heartbeat message) to one or more routers 116A-116M that may detect the saturation of the proxy instance (e.g., by determining that a threshold number of client connections are being processed by the proxy instance) and signal to the controller 114 (at circle (A)) for the controller 114 to add one or more additional database proxy instances 120B-120N (at circle (B)), which may include launching the one or more additional database proxy instances 120B-120N, updating the routing configuration of the one or more routers 116A, etc.

Traditionally, it is difficult and resource intensive to horizontally scale databases, especially when database writers are involved. However, via techniques disclosed herein, embodiments can more simply scale databases, even with writers involved, and reduce the resource burden of such scaling efforts (e.g., setting up and/or tearing down TLS connections) on the database instances by shifting it to database proxy instances. Moreover, sophisticated authentication can similarly be offloaded onto database proxy instances (e.g., by interacting with an IAM service and/or secure credential storage service) and away from the database instances themselves, allowing the database instances to perform actual data querying and manipulation operations.

In some embodiments, it may be the case that clients will only access a "new" database proxy instance when they create a new connection, as existing connections may be homed to previously existing database proxy instances. Accordingly, in some embodiments, client connections may be expired after a period of inactivity (e.g., 10 seconds inactive, 1 minute inactive, 5 minutes inactive, 30 minutes inactive, 1 hour inactive) and/or according to a schedule, leading to these clients needing to reconnect upon later need to use the database instances, which will distribute the client connection load accordingly.

In some embodiments, if a client connection drops (from the perspective of the proxy instance) the database instance may continue sending response data. Some embodiments could simply terminate this connection and create a new connection; however, some embodiments may sense the drop and allow for the response data to "drain" to the proxy instance, and upon the end, the proxy instance may re-use the connection (e.g., designate it as available within the connection pool).

Figure 5:
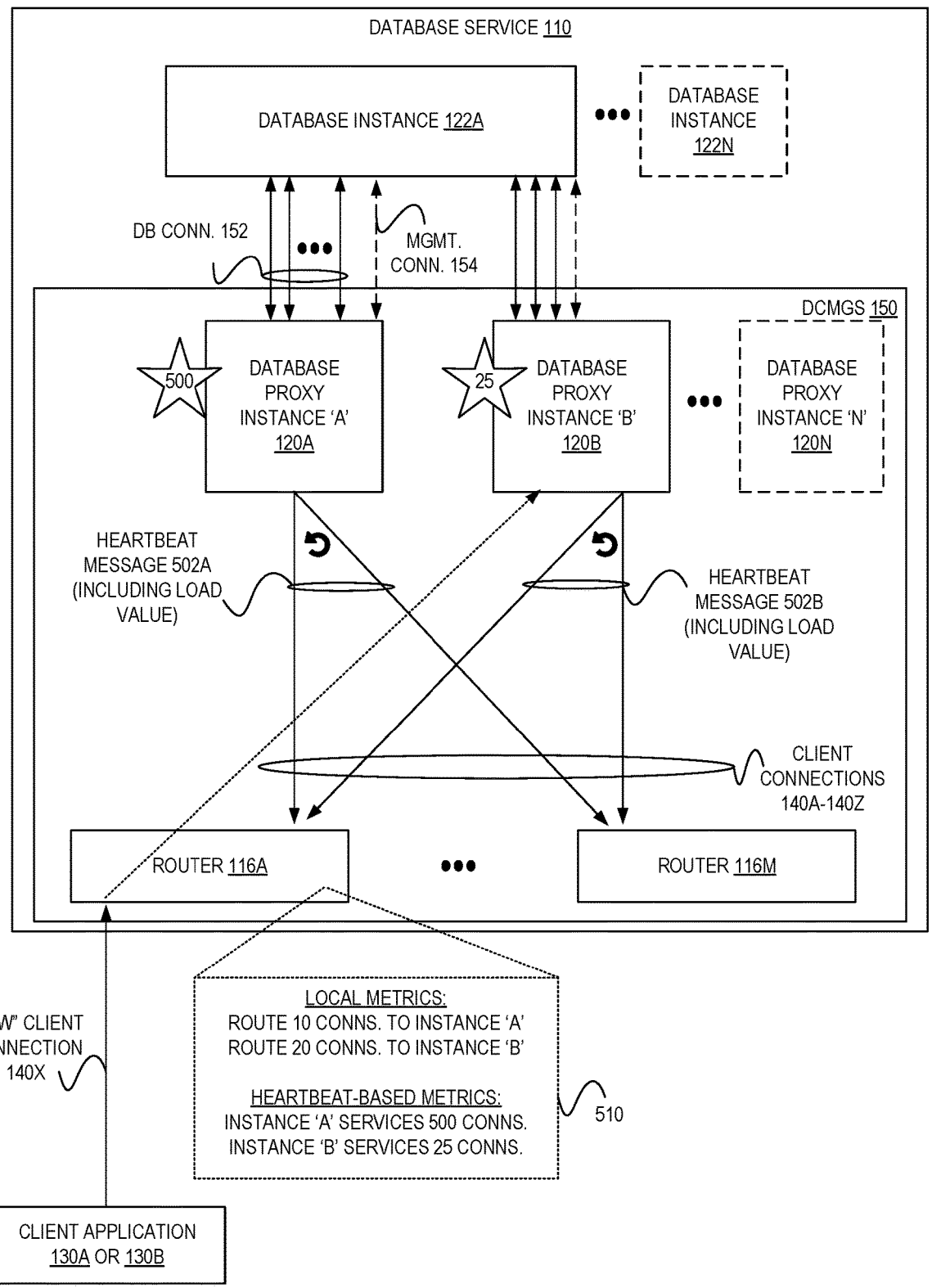
FIG. 5 is a diagram illustrating an exemplary architecture for database proxy instance selection according to some embodiments.

FIG. 5 is a diagram illustrating an exemplary architecture for database proxy instance selection according to some embodiments. As described herein, multiple routers 116A-116M might be used to distribute traffic to database proxy instances 120, and it may be the case that multiple different database proxy instances may be eligible to serve a particular client connection.

In some embodiments, a router 116A may select a database proxy instance for the client connection by identifying an eligible database proxy instance (e.g., associated with the proper database instance(s)) having a smallest load. In some embodiments, this determination may be based on comparing a number of client connections, from the router's perspective, it has routed to each such database proxy instance. As shown at 510, a router 116A may have a local perspective that it has routed ten connections to a first proxy instance 'A' and twenty connections to a second proxy instance 'B', and thus the router 116A could determine to select the database proxy instance 'A' 120A to serve the new client connection 140X. This configuration works very well when a set of database proxy instances are only interfaced via a single router 116A; however, it may be further improved upon when there are multiple involved routers 116A-116M.

In some embodiments, the database proxy instance(s) 120A-120N may periodically, or based on some schedule, send a heartbeat message 502A-502B to one or more routers 116A-116M that allows the routers 116A-116M to determine that the database proxy instance(s) 120A-120N are operational. In some embodiments, these heartbeat messages 502A-502B include a load value, as described herein, which as one example may indicate a number of client connections being served by that sending database proxy instance. In this illustrated example, the database proxy instance 'A' 120A is shown with a star icon with the number '500', indicating that the instance is serving five-hundred client connections, while the database proxy instance 'B' 120B is shown with a star icon with the number '25, indicating that the instance is serving twenty-five client connections. Thus, as shown at 510, each router 116A-116M may gain a "global" view of the true utilization of the database proxy instance(s) 120A-120N and make a better selection of a least-loaded proxy instance—here, database proxy instance 'B' is known to be serving twenty-five connections in total, despite the first router 116A passing twenty of those connections on.

In some embodiments, the set of database proxies 120 may also serve to improve the performance of a multi-instance database. For example, a database may be implemented in a "multi-master" replication configuration in which multiple ones of the database instances 122 may be able to perform writes/updates to the underlying data. In such cases, it is typically beneficial for only one of the database instances to perform these writes, thus eliminating the communication and processing overhead needed to have multiple instances updating each other, performing conflict detection and resolution, and the like. Thus, in some embodiments the database proxy instances may be configured with a consistent selection scheme allowing each proxy instance, independently, to always select a same database instance to be the recipient of a write statement—e.g., each proxy is to select a database instance having a lowest network address (or hash thereof, for example), which may be the same at all points in time, change from time period to time period (e.g., database instance 'A' is selected by all proxies for a first hour, then database instance 'D' is selected by all proxies for the next hour, and the like). This configuration beneficially performs especially well when one database instance, serving as the selected "writer" instance, experiences a failure or other problem—in this case, ones of the database proxies can detect the issue (e.g., the non-responsiveness of a database instance) and all fallback to a "next" writer instance according to their common selection scheme (e.g., a second smallest network address).

FIG. 6 is a diagram illustrating exemplary application programming interface calls used in an environment for database connection management and governance in a multi-tenant provider network according to some embodiments. As shown and described with regard to FIG. 1, a user may utilize a computing device to send one or more messages to the DCMGS 150 to provide to provide configuration information. These messages may carry API method calls to, for example, create a database proxy (shown in 605) and register one or more database proxy targets (shown in 610).

The create-db-proxy 605 API call to create a database proxy may include one or more attribute values, here shown as attribute-value pairs, including but not limited to a user-specified identifier of the proxy (db-proxy-name), an identifier of the database engine family of the associated database instances (engine-family) such as MySQL, Oracle, or the like, definitions of users and/or authentication techniques for the users (auth, which may include an identifier of a user or user group and a corresponding authentication technique such as regular database credentials, use of an IAM-based technique disclosed herein, etc.), an identifier of one or more subnets (or networks) from which client applications may access the proxy services, an identifier of whether encrypted connections (e.g., TLS or SSL) are to be used (require-tls), an identifier of one or more user-provided tags to be associated with the proxy (tags) that the user can use for resource tracking, accounting, etc.

This create-db-proxy 605 API call may be issued along with a register-db-proxy-targets 610 API call, which may include one or more attribute values, here shown as attribute-value pairs. These attribute values may include, for example, an identifier of a group of database instances (target-group-name) that may have been previously defined/registered by the user with the database service, an identifier of a cluster of database instances (db-cluster-identifier), and/or an identifier of one or more database instances (db-instance-identifier).

These API calls 605/610 may be issued by an application or user, e.g., via a computing device responsive to the user's interactions therewith. For example, a variety of types of user interfaces may be provided by the database service and/or DCMGS to allow users to configure the database connection management and governance services described herein.

For example, FIG. 7 is a diagram illustrating an exemplary user interface 700 of a database service for configuring a database proxy for database connection management and governance in a multi-tenant provider network according to some embodiments.

For example, the database service may provide a console (e.g., via a web-based application, special-purpose application, etc.) allowing for users to easily configure proxy services in a same or related interface as those used for more direct database management (e.g., as one step of database creation). This console may include user interface 700, which provides a user interface input element (e.g., a text box) allowing a user to provide an identifier (or name) for the proxy (proxy identifier, here user-configured with 'database-1_proxy-1') that may be unique for all of the user's proxies in their account or within a particular region of the provider network. This exemplary user interface 700 also provides an input element (here, a checkbox) allowing the user to specify whether encryption is to be used for the connections (require transport layer security).

This exemplary user interface 700 also provides a user input element (a drop-down box) allowing the user to indicate a percentage of the maximum connections (e.g., the maximum connection limit of the database) that can be used for the connection pool (connection pooling maximum connections, here user-configured at 90%), a drown-down box allowing the user to select "secret" credentials (e.g., provided by a secure credential storage service 109) for database user accounts that the proxy can connect to (credential manager secret(s)), an IAM execution role that the proxy system may use to access these secrets (IAM role for accessing secrets), and a drop-down box user input element allowing the user to select whether IAM-based authentication is to be used to connect to the proxy (e.g., in addition to specifying database credentials).

Alternatively, or additionally, FIG. 8, FIG. 9, FIG. 10, and FIG. 11 are diagrams illustrating exemplary user interfaces for creating a database proxy for database connection management and governance in a multi-tenant provider network according to some embodiments. This set of user interfaces may be offered as part of a dedicated flow for configuring proxy-based services for a database.

The user interface 800 of FIG. 8 may include similar user input elements as those shown in FIG. 7, which may solicit configuration data for a proxy identifier, an identifier of the database engine family, and whether to require encryption for the database connections.

As a next user interface 900, FIG. 9 allows a user to specify a target group of databases to be served by the proxy-based service, such as via an 'add databases' user input element where a user may select, one or more times, identifiers of databases already known to the database service. In this example, the user has selected identifiers of two databases 'B' and 'D', both of which are MySQL type databases. This user interface 900 also allows the user to provide an idle timeout for clients (here, via selecting a value for minutes and seconds) indicating at which point a client connection can be "closed" after inactivity. This user interface 900 also allows the user to specify conditions when client connections are—or are not—to be pinned to database connections (here, opting out of a default pinning configuration for certain statements), and/or set a connection "borrowing" timeout value (by setting minutes and seconds values) for how long a database connection can be "borrowed" from the pool.

The user interface 1000 of FIG. 10 allows a user to specify authentication-related configuration information, including what "secret" credentials are to be used to create connections with the database (credentials manager resource name), an IAM role for the proxy to use to access these secret credentials (IAM role), an identification of what authentication method for clients (e.g., default username and password encryption via the database itself, credentials stored in a secure credential storage service 109, IAM authentication roles, etc.), an identifier of a virtual network for the database, and/or one or more subnets (here, selected as "default" and "SUB-1A") providing IP ranges the database can use in the selected virtual network.

The user interface 1100 of FIG. 11 includes additional user interface input elements related to configuring capacity settings, which may include allowing a user to specify whether the DCMGS 150 may auto-manage (e.g., auto-scale) the amount of resources used, and/or a minimum and/or maximum amount of "capacity" units (e.g., a number of compute instances, an amount of individual computing resources, etc.) that the proxies may utilize—here, the user has specified that a minimum of two compute instances (each executing/implementing a proxy instance) may be used while a maximum of two-hundred and fifty-six compute instances may be utilized.

Figure 12:
FIG. 12 is a diagram illustrating an exemplary connection string modification for utilizing a database proxy for database connection management and governance in a multi-tenant provider network according to some embodiments.

FIG. 12 is a diagram illustrating an exemplary connection string modification for utilizing a database proxy for database connection management and governance in a multi-tenant provider network according to some embodiments. As described herein, upon configuring the proxy-based database connection management and governance, the DCMGS 150 may provide a response to the user/client indicating an endpoint (e.g., one or more of a network address, hostname, port, etc.) that the user may utilize to access the database instance(s). The user may thus configure its application(s) to access the database by, for example, simply changing a query connection string to use the returned hostname and port. Thus, an existing connection string 1205 may be modified by changing the DATABASE_INSTANCE_HOSTNAME to the DCMGS-returned DBPROXY_DNS_NAME (in 1210) and the DATABASE_INSTANCE_PORT (in 1205) to the DBPROXY_PORT (in 1210).

Figure 13:
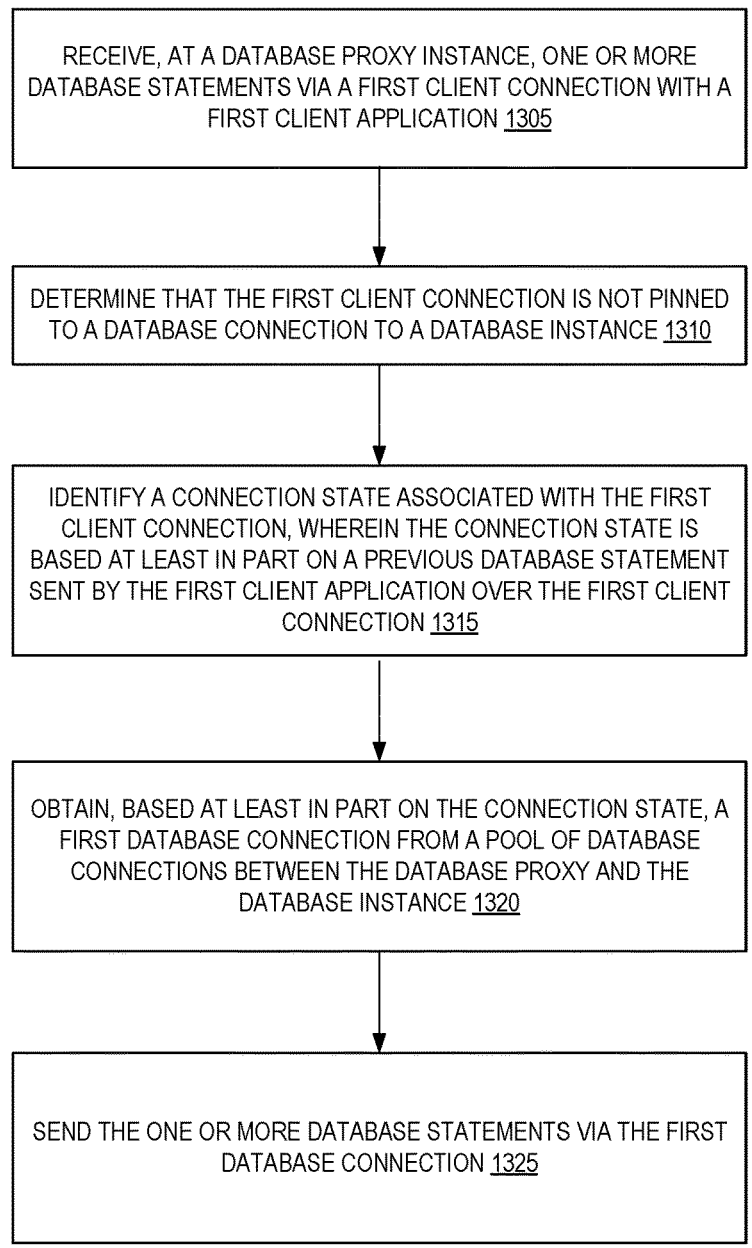
FIG. 13 is a flow diagram illustrating operations of a method for database connection management and governance in a multi-tenant provider network according to some embodiments.

FIG. 13 is a flow diagram illustrating operations 1300 of a method for database connection management and governance according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1300 are performed by the DCMGS 150 and/or database service 110 of the other figures.

The operations 1300 include, at block 1305, receiving, at a database proxy instance, one or more database statements via a first client connection with a first client application. The database statement(s) may include, for example, a database query such as a 'select' query, an update statement, a delete statement, or the like. The first client application and the database proxy instance may be implemented within a multi-tenant provider network, and the first client application may be executed by a hardware virtualization service, a serverless code execution service, etc.

The operations 1300 further include, at block 1310, determining that the first client connection is not pinned to a database connection to a database instance. In some embodiments, the determining includes using a key (e.g., an identifier of the first client connection, etc.) to perform a lookup in a data structure to determine whether the connection is already mapped to a particular database connection, and in this case, determining that it is not. In some embodiments, client connections may be pinned to a database connection when the client issues a particular type of database statement (e.g., that changes a state of the connection in a particular way), when the database proxy instance is servicing less than a threshold amount of client connections, when less than a threshold amount of client connections are active or predicted to be active, when less than a threshold amount of database connections are being used, etc.

The operations 1300 further include, at block 1315, identifying a connection state associated with the first client connection, wherein the connection state is based at least in part on a previous database statement sent by the first client application over the first client connection. In some embodiments, a state of each client connection is tracked by the database proxy instance based on tracking, e.g., commands sent as part of database statements. In some embodiments, such state is tracked for each client connection in a data structure.

At block 1320, the operations 1300 further include obtaining, based at least in part on the connection state, a first database connection from a pool of database connections between the database proxy and the database instance. In various embodiments, the obtaining may include creating a new database connection, identifying a database connection with state that is the same as (or, does not conflict) with the state of the connection state of the client connection, modifying a database connection that has state that conflicts with the client connection state so that it no longer does conflict (e.g., by sending or "replaying" one or more database statements that set state), etc.

In some embodiments, block 1320 includes determining that the connection state associated with the first client connection does not conflict with another connection state associated with the first database connection.

In some embodiments, block 1320 includes sending, via the first database connection, a fifth one or more database statements to cause the first database connection to adhere to the connection state associated with the first client connection, wherein the fifth one or more database statements are selected based at least in part on the connection state. In some embodiments, the fifth one or more database statements cause the database instance to update at least one of: a system variable, wherein the system variable comprises one of a time zone, a session timeout, a connection mode, or a Structured Query Language (SQL) standard or mode; a connection property value, comprising one of a character set, a username, or an encryption utilization; or a database property, comprising one of a temporary table or a prepared statement.

The operations 1300 further include, at block 1325, sending the one or more database statements via the first database connection. The one or more database statements may be specified according to SQL dialect, and may sent via use of IP messages to an endpoint within the provider network that is associated with the database instance.

In some embodiments, the operations 1300 further include determining, by the database proxy instance, that the first client connection is to be pinned to the first database connection; receiving a second one or more database statements via the first client connection; determining that the first client connection is pinned to the first database connection; and sending the second one or more database statements via the first database connection. In some embodiments, the determining that the first client connection is to be pinned to the first database connection is based on an analysis of a third one or more database statements received via the first client connection prior to the receiving of the second one or more database statements.

In some embodiments, the operations 1300 further include determining that the first database connection is no longer actively in use by the first client application; and designating the first database connection as being available within the pool of database connections. In some embodiments, the operations 1300 further include receiving a fourth one or more database statements via a second client connection; and sending the fourth one or more database statements over the first database connection while the first client connection with the first client application still exists.

In some embodiments, the operations 1300 further include receiving, at a provider network, one or more request messages originated by a client device of a user of the provider network to configure the database proxy within the provider network, the one or more request messages identifying one or more database instances within the provider network, the one or more database instances including the database instance; launching one or more database proxy instances within the provider network, the one or more database proxy instances including the database proxy instance; associating an endpoint within the provider network with the one or more database proxy instances; connecting, by each of the one or more database proxy instances, with the one or more database instances. In some embodiments, the operations 1300 further include determining to add another database proxy instance to the one or more database proxy instances to yield a plurality of database proxy instances; launching the another database proxy instance; and updating at least one of a router or a load balancer to send traffic to the plurality of database proxy instances. In some embodiments, the operations 1300 further include receiving, at a router or a load balancer, a plurality of heartbeat signals originated by the plurality of database proxy instances, and in some embodiments, the operations 1300 also include determining that one or more expected heartbeat signals were not received from the database proxy instance; and causing a failover from the database proxy instance to another database proxy instance for at least some client connections. In some embodiments, the operations 1300 further include maintaining the first client connection during the failover; ending the failover; receiving a sixth one or more database statements via the first client connection from the first client application; and sending the sixth one or more database statements via the database proxy instance, wherein the failover was not visible to the first client application. In some embodiments, each of the plurality of heartbeat signals includes a load value associated with the corresponding database proxy instance, wherein the load value is one of a resource utilization amount or a number of client connections; and the operations further include selecting, by the router or the load balancer, one database proxy instance to be a recipient of traffic based on an analysis of one or more of the plurality of load values.

Figure 14:
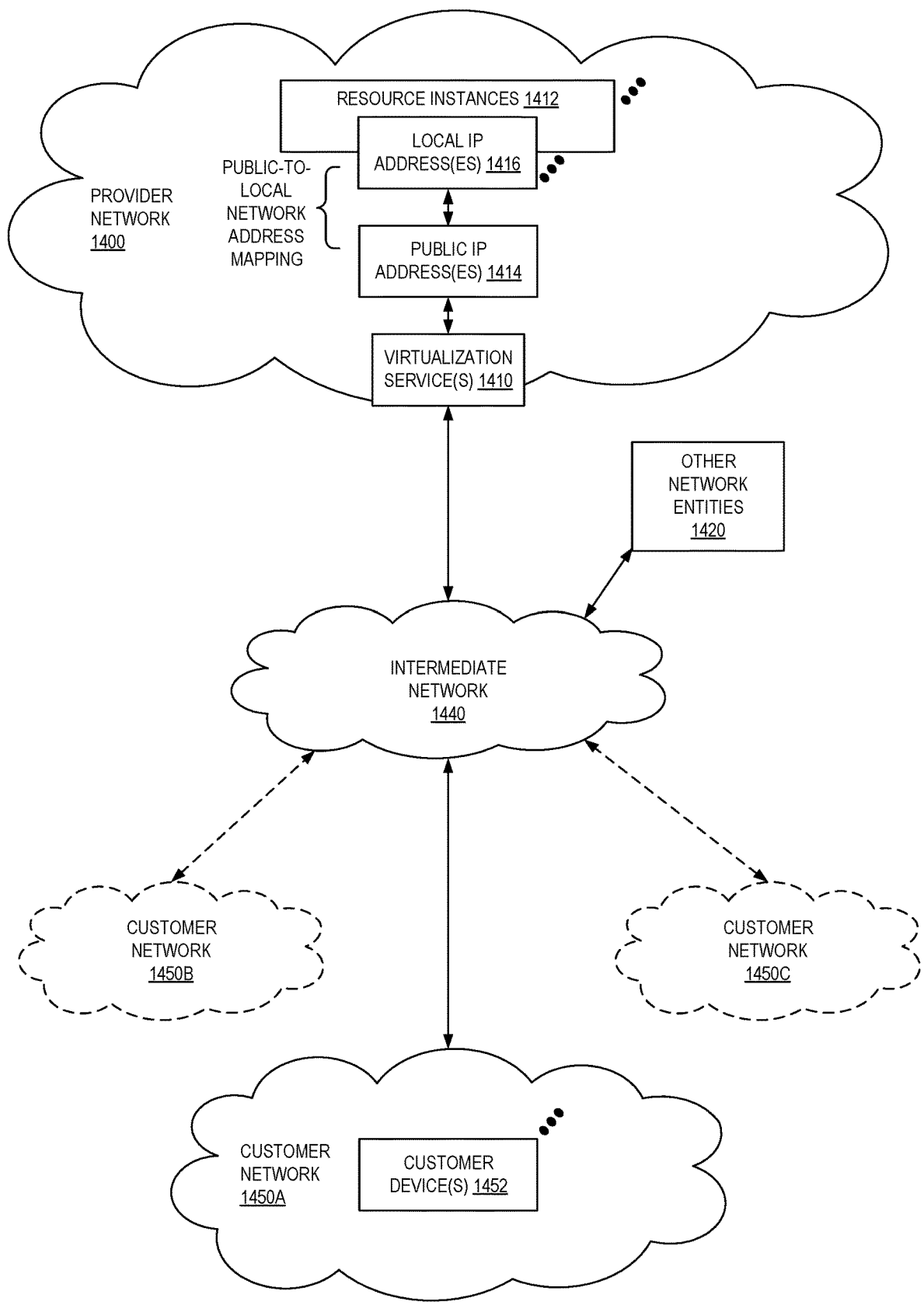
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
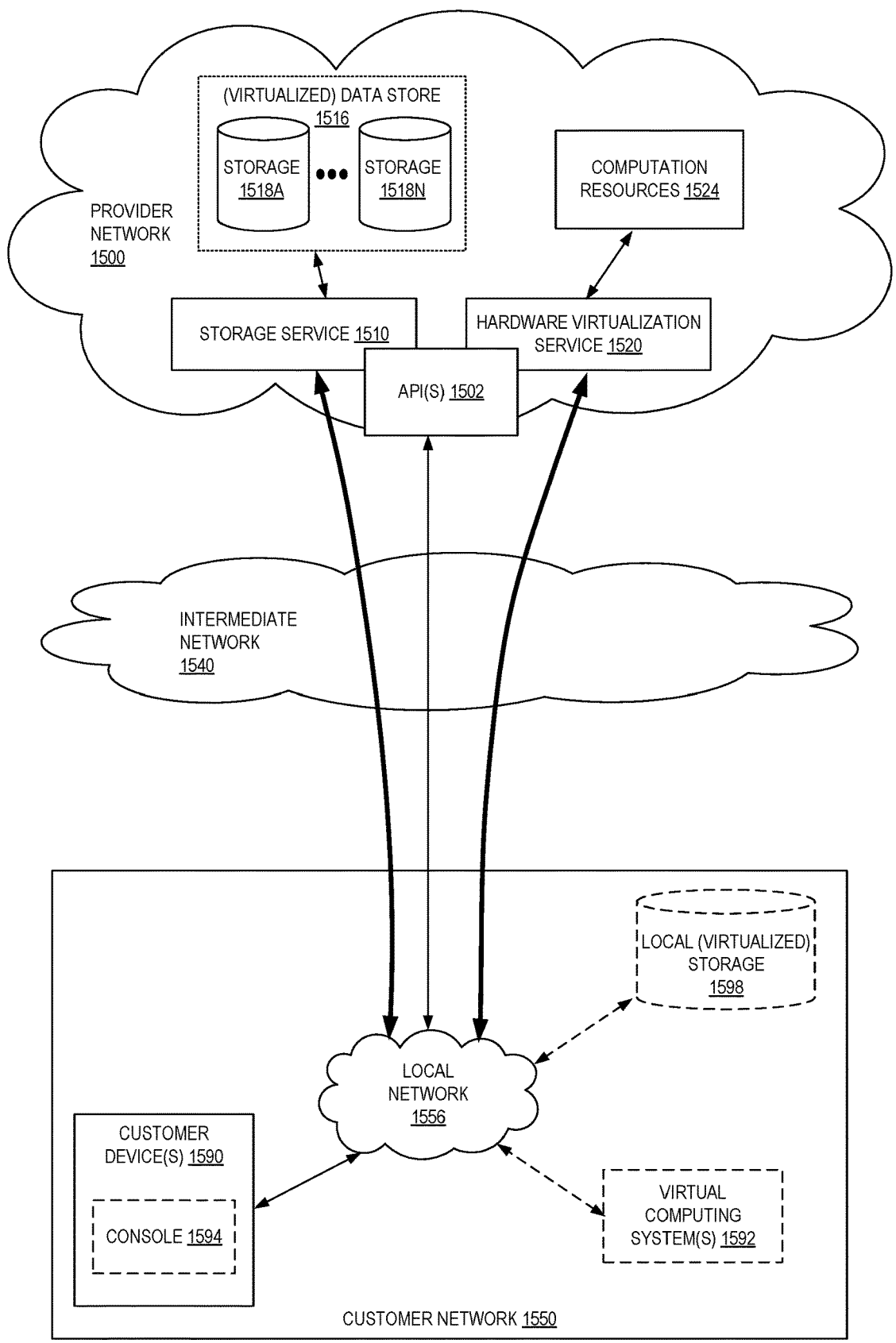
FIG. 15 is a block diagram of an example provider network that provides a storage service and a hardware virtualization service to customers according to some embodiments.

FIG. 15 is a block diagram of an example provider network that provides a storage service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative Systems

Figure 16:
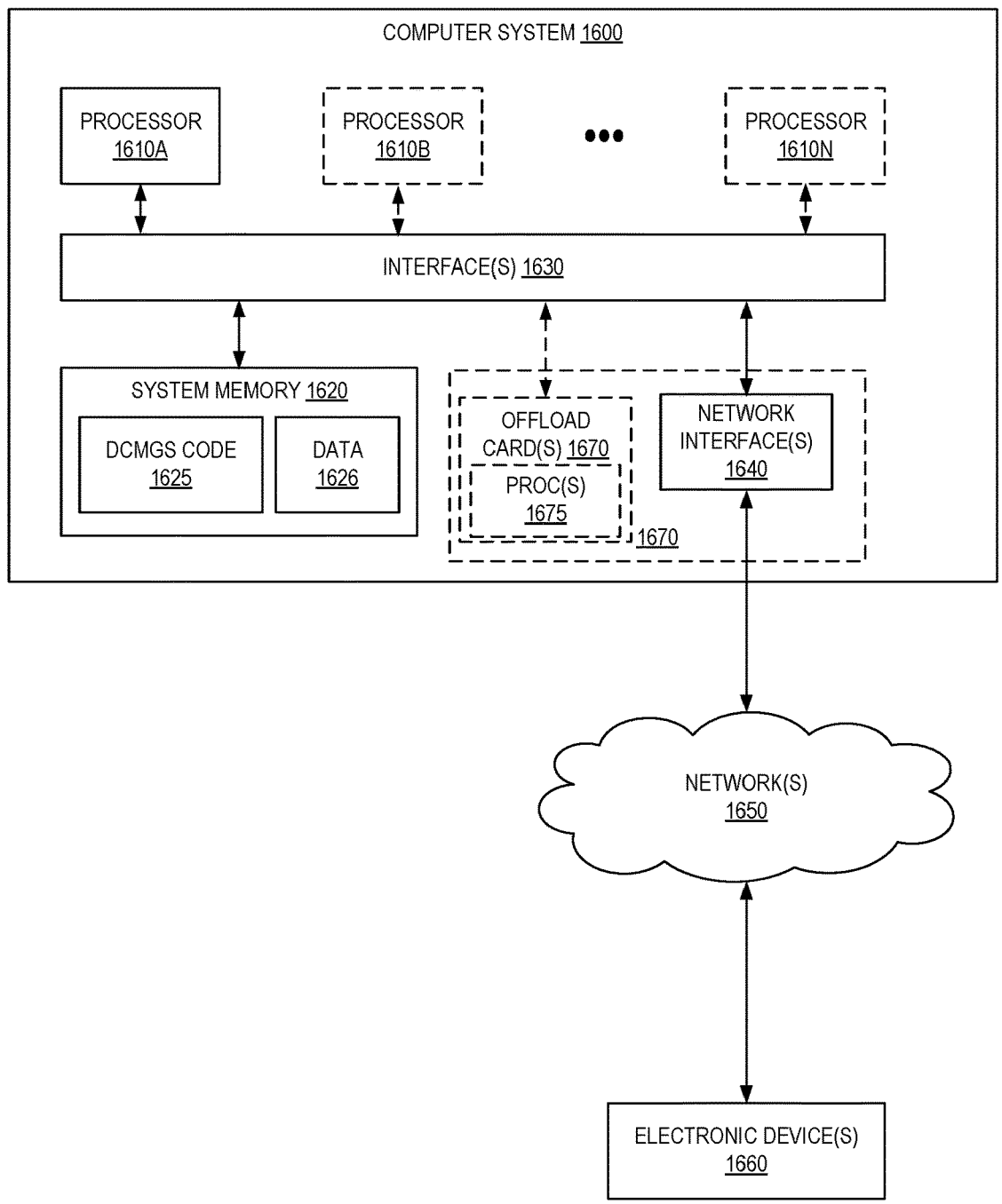
FIG. 16 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as DCMGS code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1518A-1518N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a database proxy instance, one or more database statements via a first client connection with a first client application;
determining that the first client connection is not pinned to a database connection to a database instance;
identifying a connection state associated with the first client connection, wherein the connection state is based at least in part on a previous database statement sent by the first client application over the first client connection;
obtaining, based at least in part on the connection state, a first database connection from a pool of database connections between the database proxy instance and the database instance;
sending the one or more database statements via the first database connection;
determining, by the database proxy instance, that the first client connection is to be pinned to the first database connection;
receiving a second one or more database statements via the first client connection;
determining that the first client connection is pinned to the first database connection; and
sending the second one or more database statements via the first database connection,
wherein the determining that the first client connection is to be pinned to the first database connection is based on an analysis of a third one or more database statements received via the first client connection prior to the receiving of the second one or more database statements.

2. The computer-implemented method of claim 1, further comprising:
determining that the first database connection is no longer actively in use by the first client application; and
designating the first database connection as being available within the pool of database connections.

3. The computer-implemented method of claim 2, further comprising:
receiving a fourth one or more database statements via a second client connection; and
sending the fourth one or more database statements over the first database connection while the first client connection with the first client application still exists.

4. The computer-implemented method of claim 1, wherein obtaining the first database connection from the pool of database connections comprises:
determining that the connection state associated with the first client connection does not conflict with another connection state associated with the first database connection.

5. The computer-implemented method of claim 1, wherein obtaining the first database connection from the pool of database connections comprises:
sending, via the first database connection, a fifth one or more database statements to cause the first database connection to adhere to the connection state associated with the first client connection, wherein the fifth one or more database statements are selected based at least in part on the connection state.

6. The computer-implemented method of claim 5, wherein the fifth one or more database statements cause the database instance to update at least one of:
a system variable, wherein the system variable comprises one of a timezone, a session timeout, a connection mode, or a Structured Query Language (SQL) standard or mode;
a connection property value, comprising one of a character set, a username, or an encryption utilization; or
a database property, comprising one of a temporary table or a prepared statement.

7. The computer-implemented method of claim 1, further comprising:
receiving, at a provider network, one or more request messages originated by a client device of a user of the provider network to configure the database proxy instance within the provider network, the one or more request messages identifying one or more database instances within the provider network, the one or more database instances including the database instance;
launching one or more database proxy instances within the provider network, the one or more database proxy instances including the database proxy instance;
associating an endpoint within the provider network with the one or more database proxy instances; and
connecting, by each of the one or more database proxy instances, with the one or more database instances.

8. The computer-implemented method of claim 7, further comprising:
determining to add another database proxy instance to the one or more database proxy instances to yield a plurality of database proxy instances;
launching the another database proxy instance; and
updating at least one of a router or a load balancer to send traffic to the plurality of database proxy instances.

9. The computer-implemented method of claim 8, further comprising:
receiving, at a router or a load balancer, a plurality of heartbeat signals originated by the plurality of database proxy instances.

10. The computer-implemented method of claim 9, further comprising:
determining that one or more expected heartbeat signals were not received from the database proxy instance; and
causing a failover from the database proxy instance to another database proxy instance for at least some client connections.

11. The computer-implemented method of claim 10, further comprising:
maintaining the first client connection during the failover;
ending the failover;
receiving a sixth one or more database statements via the first client connection from the first client application; and
sending the sixth one or more database statements via the database proxy instance, wherein the failover was not visible to the first client application.

12. The computer-implemented method of claim 9, wherein:
each of the plurality of heartbeat signals includes a load value associated with the corresponding database proxy instance, wherein the load value is one of a resource utilization amount or a number of client connections; and
the method further comprises selecting, by the router or the load balancer, one database proxy instance to be a recipient of traffic based on an analysis of one or more of the plurality of load values.

13. A system comprising:
a first one or more electronic devices to implement one or more database instances; and
a second one or more electronic devices to implement one or more database proxy instances, the one or more database proxy instances including instructions that upon execution cause the one or more database proxy instances to:
receive one or more database statements via a first client connection with a first client application;
determine that the first client connection is not pinned to a database connection to a database instance;
identify a connection state associated with the first client connection, wherein the connection state is based at least in part on a previous database statement sent by the first client application over the first client connection;
obtain, based at least in part on the connection state, a first database connection from a pool of database connections between the database proxy instance and the database instance;
send the one or more database statements via the first database connection;
determine that the first client connection is to be pinned to the first database connection;
receive a second one or more database statements via the first client connection;
determine that the first client connection is pinned to the first database connection; and
send the second one or more database statements via the first database connection,
wherein the determination that the first client connection is to be pinned to the first database connection is based on an analysis of a third one or more database statements received via the first client connection prior to the receiving of the second one or more database statements.

14. The system of claim 13, wherein to obtain the first database connection from the pool of database connections, the instructions upon execution further cause the one or more database proxy instances to:
  determine that the connection state associated with the first client connection does not conflict with another connection state associated with the first database connection.

15. The system of claim 13, wherein to obtain the first database connection from the pool of database connections, the instructions upon execution further cause the one or more database proxy instances to:
  send, via the first database connection, a fourth one or more database statements to cause the first database connection to adhere to the connection state associated with the first client connection, wherein the fourth one or more database statements are selected based at least in part on the connection state.

16. A computer-implemented method comprising:
  receiving, at a provider network, one or more request messages originated by a client device of a user of the provider network to configure a database proxy instance within the provider network, the one or more request messages identifying one or more database instances within the provider network, the one or more database instances including a database instance;
  launching one or more database proxy instances within the provider network, the one or more database proxy instances including the database proxy instance;
  associating an endpoint within the provider network with the one or more database proxy instances;
  connecting, by each of the one or more database proxy instances, with the one or more database instances;
  receiving, at the database proxy instance, one or more database statements via a first client connection with a first client application;
  determining that the first client connection is not pinned to a database connection to the database instance;
  identifying a connection state associated with the first client connection, wherein the connection state is based at least in part on a previous database statement sent by the first client application over the first client connection;
  obtaining, based at least in part on the connection state, a first database connection from a pool of database connections between the database proxy instance and the database instance; and
  sending the one or more database statements via the first database connection.

17. The computer-implemented method of claim 16, wherein obtaining the first database connection from the pool of database connections comprises:
  determining that the connection state associated with the first client connection does not conflict with another connection state associated with the first database connection.

18. The computer-implemented method of claim 16, further comprising:
  determining to add another database proxy instance to the one or more database proxy instances to yield a plurality of database proxy instances;
  launching the another database proxy instance; and
  updating at least one of a router or a load balancer to send traffic to the plurality of database proxy instances.

19. A system comprising:
  a first one or more electronic devices to implement one or more database instances in a provider network; and
  a second one or more electronic devices to implement a database connection management and governance system (DCMGS) of a provider network, the DCMGS including instructions that upon execution cause the DCMGS to:
  receive one or more request messages originated by a client device of a user of the provider network to configure a database proxy instance within the provider network, the one or more request messages identifying one or more database instances within the provider network, the one or more database instances including a database instance;
  launch one or more database proxy instances within the provider network, the one or more database proxy instances including the database proxy instance;
  associate an endpoint within the provider network with the one or more database proxy instances;
  connect, by each of the one or more database proxy instances, with the one or more database instances;
  receive, at the database proxy instance, one or more database statements via a first client connection with a first client application;
  determine, by the database proxy instance, that the first client connection is not pinned to a database connection to a database instance;
  identify, by the database proxy instance, a connection state associated with the first client connection, wherein the connection state is based at least in part on a previous database statement sent by the first client application over the first client connection;
  obtain, by the database proxy instance based at least in part on the connection state, a first database connection from a pool of database connections between the database proxy instance and the database instance; and
  send, by the database proxy instance, the one or more database statements via the first database connection.

20. The system of claim 19, wherein to obtain the first database connection from the pool of database connections, the instructions upon execution further cause the one or more database proxy instances to:
  determine that the connection state associated with the first client connection does not conflict with another connection state associated with the first database connection.

21. The system of claim 19, wherein the DCMGS further includes instructions that upon execution cause the DCMGS to:
  determine to add another database proxy instance to the one or more database proxy instances to yield a plurality of database proxy instances;
  launch the another database proxy instance; and
  update at least one of a router or a load balancer to send traffic to the plurality of database proxy instances.

22. A non-transitory computer readable medium storing instructions which, when executed by one or more processors of one or more computing devices, cause the one or more computing devices to implement a database proxy instance to perform operations comprising:
  receiving, at the database proxy instance, one or more database statements via a first client connection with a first client application;
  determining that the first client connection is not pinned to a database connection to a database instance;
  identifying a connection state associated with the first client connection, wherein the connection state is based at least in part on a previous database statement sent by the first client application over the first client connection;

obtaining, based at least in part on the connection state, a first database connection from a pool of database connections between the database proxy instance and the database instance;

sending the one or more database statements via the first database connection;

determining, by the database proxy instance, that the first client connection is to be pinned to the first database connection;

receiving a second one or more database statements via the first client connection;

determining that the first client connection is pinned to the first database connection; and sending the second one or more database statements via the first database connection, wherein the determining that the first client connection is to be pinned to the first database connection is based on an analysis of a third one or more database statements received via the first client connection prior to the receiving of the second one or more database statements.

23. The non-transitory computer readable medium of claim 22, further comprising instructions which, when executed by the one or more processors of the one or more computing devices, cause the database proxy instance to perform operations comprising:

determining that the first database connection is no longer actively in use by the first client application; and designating the first database connection as being available within the pool of database connections.

24. A non-transitory computer readable medium storing instructions which, when executed by one or more processors of one or more computing devices, cause the one or more computing devices of a provider network to perform operations comprising:

receiving, at the provider network, one or more request messages originated by a client device of a user of the provider network to configure a database proxy instance within the provider network, the one or more request messages identifying one or more database instances within the provider network, the one or more database instances including a database instance;

launching one or more database proxy instances within the provider network, the one or more database proxy instances including the database proxy instance;

associating an endpoint within the provider network with the one or more database proxy instances;

connecting, by each of the one or more database proxy instances, with the one or more database instances;

receiving, at the database proxy instance, one or more database statements via a first client connection with a first client application;

determining that the first client connection is not pinned to a database connection to the database instance;

identifying a connection state associated with the first client connection, wherein the connection state is based at least in part on a previous database statement sent by the first client application over the first client connection;

obtaining, based at least in part on the connection state, a first database connection from a pool of database connections between the database proxy instance and the database instance; and sending the one or more database statements via the first database connection.

25. The non-transitory computer readable medium of claim 24, wherein obtaining the first database connection from the pool of database connections comprises:

determining that the connection state associated with the first client connection does not conflict with another connection state associated with the first database connection.

* * * * *